US012669968B2

(12) United States Patent
Hayakawa

(10) Patent No.: US 12,669,968 B2
(45) Date of Patent: Jun. 30, 2026

(54) IMAGE PROCESSING APPARATUS, IMAGE PROCESSING METHOD, AND COMPUTER READABLE STORAGE MEDIUM

(71) Applicant: CANON KABUSHIKI KAISHA, Tokyo (JP)

(72) Inventor: Takeshi Hayakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 18/438,327

(22) Filed: Feb. 9, 2024

(65) Prior Publication Data

US 2024/0272847 A1 Aug. 15, 2024

(30) Foreign Application Priority Data

Feb. 15, 2023 (JP) ................................. 2023-021395

(51) Int. Cl.
*G06F 3/12* (2006.01)

(52) U.S. Cl.
CPC .......... *G06F 3/1238* (2013.01); *G06F 3/1203* (2013.01); *G06F 3/1253* (2013.01);
(Continued)

(58) Field of Classification Search
CPC .... G06F 3/1238; G06F 3/1203; G06F 3/1253; G06F 3/1286; G06F 3/1287;
(Continued)

(56) References Cited

U.S. PATENT DOCUMENTS

2010/0231950 A1* 9/2010 Sawayanagi .......... G06F 3/1286
358/1.14
2015/0296100 A1* 10/2015 Shogaki ............. H04N 1/32117
358/1.14

(Continued)

FOREIGN PATENT DOCUMENTS

GB 2497390 * 10/2012
JP 2016143196 A 8/2016
JP 6207651 * 10/2017

OTHER PUBLICATIONS

Machine translation for JP 6207651 (Year: 2017).*
Machine translation for JP 2016-143196, IDS (Year: 2016).*

*Primary Examiner* — Qian Yang
(74) *Attorney, Agent, or Firm* — Canon U.S.A., Inc. IP Division

(57) ABSTRACT

An image processing apparatus comprises a display device capable of providing an operation panel, one or more memories storing instructions, and one or more processors. The one or more processors executes the instructions causing the image processing apparatus to receive a request for permission of display of the operation panel from an external apparatus, display a confirmation screen if an account of a user having logged in to an application of the external apparatus, the account being included in the request, and an account of a user having logged in to the image processing apparatus are not matched with each other, and, if the permission of the display of the operation panel on the external apparatus is accepted via the confirmation screen, transmit, to the external apparatus, information corresponding to a display content of the operation panel to provide the display content in the application.

7 Claims, 17 Drawing Sheets

(52) U.S. Cl.
CPC .......... *G06F 3/1286* (2013.01); *G06F 3/1287* (2013.01); *G06F 3/1292* (2013.01); *G06F 3/1293* (2013.01)

(58) Field of Classification Search
CPC .... G06F 3/1292; G06F 3/1293; G06F 3/1239; H04N 1/00352; H04N 1/00307; H04N 1/4406

See application file for complete search history.

(56) References Cited

U.S. PATENT DOCUMENTS

| | | | |
|---|---|---|---|
| 2016/0062709 A1* | 3/2016 | Itami | G06F 3/1285 |
| | | | 358/1.13 |
| 2017/0063875 A1* | 3/2017 | Yanase | H04L 63/0876 |
| 2017/0264758 A1* | 9/2017 | Naito | H04W 4/80 |
| 2019/0004750 A1* | 1/2019 | Murata | H04L 67/12 |
| 2019/0037105 A1* | 1/2019 | Sato | H04N 1/00464 |
| 2020/0089443 A1* | 3/2020 | Kashiwagi | G06F 3/1288 |
| 2022/0129218 A1* | 4/2022 | Saito | G06F 3/1285 |

* cited by examiner

WIRELESS LAN TERMINAL
COMMUNICATION DEVICE
303

304 MOBILE
TERMINAL

CLOUD SERVICE
305

301

302 PRINTER

FIG. 5

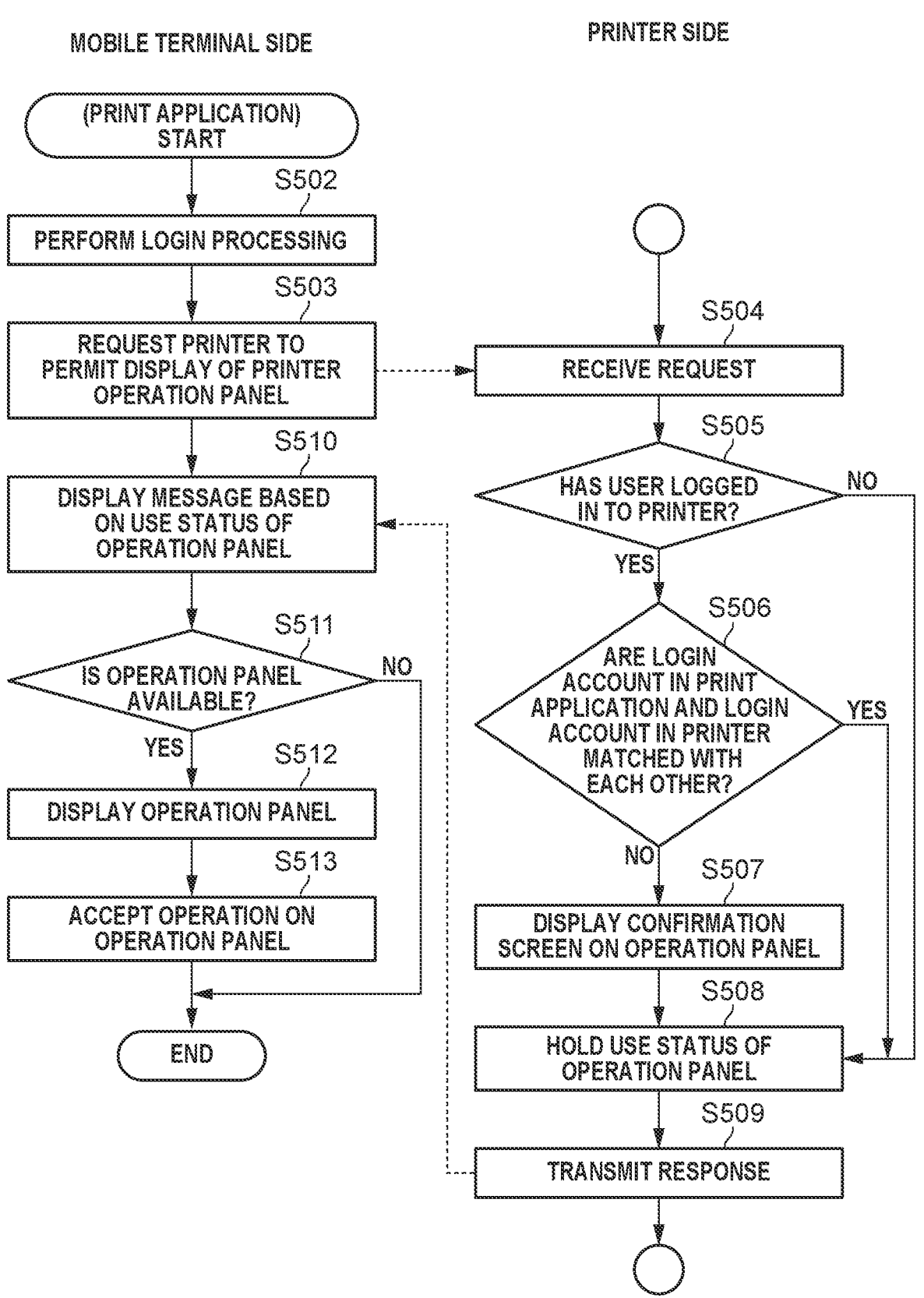

MOBILE TERMINAL SIDE

PRINTER SIDE (PRINT APPLICATION)
START

S502

PERFORM LOGIN PROCESSING

S503

REQUEST PRINTER TO
PERMIT DISPLAY OF PRINTER
OPERATION PANEL

S510

DISPLAY MESSAGE BASED
ON USE STATUS OF
OPERATION PANEL

S511

IS OPERATION PANEL
AVAILABLE?                NO

YES          S512

DISPLAY OPERATION PANEL

S513

ACCEPT OPERATION ON
OPERATION PANEL

END

S504

RECEIVE REQUEST

S505

HAS USER LOGGED
IN TO PRINTER?          NO

YES

S506

ARE LOGIN
ACCOUNT IN PRINT
APPLICATION AND LOGIN
ACCOUNT IN PRINTER
MATCHED WITH
EACH OTHER?          YES

NO          S507

DISPLAY CONFIRMATION
SCREEN ON OPERATION PANEL

S508

HOLD USE STATUS OF
OPERATION PANEL

S509

TRANSMIT RESPONSE

FIG. 11

| | OPERATION PANEL AVAILABLE/ UNAVAILABLE | ACCOUNT MATCH/ NON-MATCH |
|---|---|---|
| 1 | AVAILABLE | MATCH |
| 2 | AVAILABLE | NON-MATCH |
| 3 | AVAILABLE | NOT LOGGED IN |
| 4 | UNAVAILABLE | MATCH |
| 5 | UNAVAILABLE | NON-MATCH |
| 6 | UNAVAILABLE | NOT LOGGED IN |

1102

1502

1602

IMAGE PROCESSING APPARATUS, IMAGE PROCESSING METHOD, AND COMPUTER READABLE STORAGE MEDIUM

BACKGROUND

Field of the Disclosure

The present disclosure relates to a technique of enabling a remote operation of an operation panel included in an image processing apparatus from an external apparatus via a network.

Description of the Related Art

An image processing apparatus, such as a printer and a multi-function peripheral, includes an operation panel for selecting a function of the image processing apparatus and accepting an execution instruction from a user. The image processing apparatus has conventionally provided information corresponding to a display content of the operation panel to an external apparatus, such as a mobile terminal, via a network. The display content of the operation panel is displayed on a display unit of the external apparatus based on the provided information. By operating a screen of the operation panel, it is also possible to remotely operate the image processing apparatus from the external apparatus (for example, Japanese Patent Application Laid-Open No. 2016-143196).

SUMMARY

When the image processing apparatus is accessed by the external apparatus via the network and provides information corresponding to the display content of the operation panel to the external apparatus, there is a possibility that the operation panel of the image processing apparatus is operated by a user who is different from a user who operates the external apparatus. For example, in a case where an administrator user who has logged in to the image processing apparatus as an administrator operates the operation panel and makes important settings for the administrator, the image processing apparatus should possibly put a restriction on provision of the information corresponding to the display content of the operation panel to the external apparatus.

On the other hand, when the operation panel is operated with an account of a general user, there is a case where such a restriction is unnecessary depending on the intention for the operation by the user of the image processing apparatus. Regarding the provision of the information corresponding to the display content of the operation panel by the image processing apparatus, it may be necessary to take into consideration of an account of the user on the external apparatus.

According to an aspect of the present disclosure, an image processing apparatus includes a display device, wherein the display device is capable of providing an operation panel configured to receive an operation regarding at least one of a print function or a scan function, one or more memories storing instructions, and one or more processors. The one or more processors executes the instructions causing the image processing apparatus to receive a request for permission of display of the operation panel from an external apparatus, display a confirmation screen in a case where an account of a user who has logged in to an application of the external apparatus, the account being included in the request, and an account of a user who has logged in to the image processing apparatus are not matched with each other, and, in a case where the permission of the display of the operation panel on the external apparatus is accepted via the confirmation screen, transmit, to the external apparatus, information corresponding to a display content of the operation panel to provide the display content in the application.

Further features of various embodiments of the present disclosure will become apparent from the following description of exemplary embodiments with reference to the attached drawings.

BRIEF DESCRIPTION OF THE DRAWINGS

FIG. 5 is a flowchart for describing processing executed by each of the mobile terminal and the printer.

FIG. 11 illustrates an example of status information regarding use of the printer operation panel in the printer.

DESCRIPTION OF THE EMBODIMENTS

An example mode for implementing the present disclosure will be described with reference to the drawings.

In the present exemplary embodiment, a mobile terminal, such as a tablet terminal and a smartphone, is an example of an external apparatus. The external apparatus executes an operating system (hereinafter referred to as OS) and a plurality of programs to provide various functions, such as data communication and display control.

Figure 1:
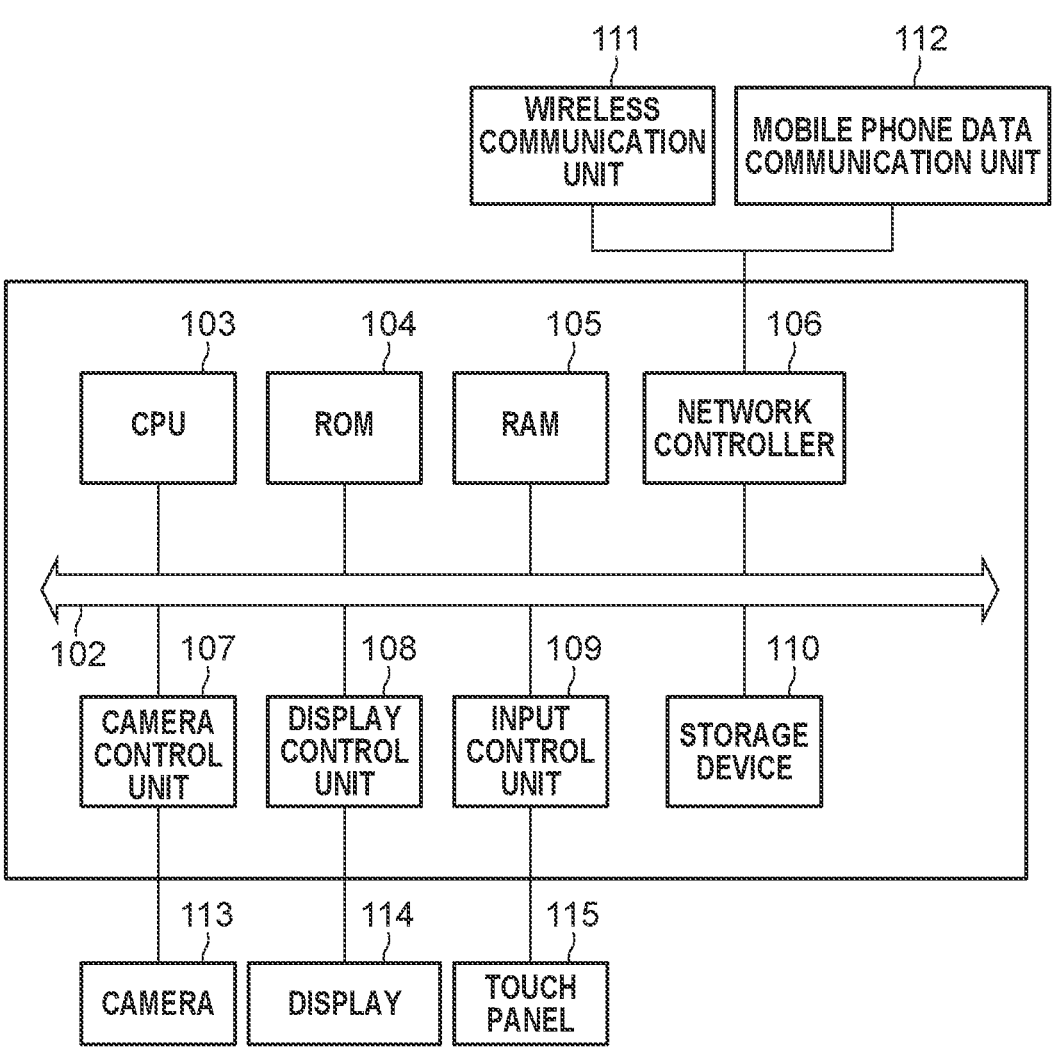
FIG. 1 is a block diagram illustrating an example of a hardware configuration of a mobile terminal.

A first exemplary embodiment is now to be described. FIG. 1 is a block diagram illustrating an example of a hardware configuration of a mobile terminal, which is one example of the external apparatus.

Each component of hardware is connected to a system bus 102. An operating system is stored in a read-only memory (ROM) 104 and executed by a central processing unit (CPU) 103. A random-access memory (RAM) 105 is a work memory area for executing a program. The RAM 105 is also a memory that temporarily stores processing, such as communication and a camera operation. An application (program) for implementing processing regarding a flowchart in the present exemplary embodiment is also executed by the CPU 103. The flowchart will be described below.

A storage device 110 is a non-volatile storage device, and stores therein various kinds of operation mode settings, operation logs, applications, and the like, which need to be held also after re-start of the mobile terminal.

A network controller 106 performs communication control of a wireless communication unit 111 and a mobile phone data communication unit 112. A camera control unit 107 controls a camera 113 of the mobile terminal. A display control unit 108 controls information to be output to a display 114 of the mobile terminal. An input control unit 109 controls information instructed by a user with a button of the mobile terminal or a touch panel 115. The mobile terminal provides the user with various kinds of information such as network communication information and a camera operation using the display control unit 108 and the input control unit 109.

Figure 2:
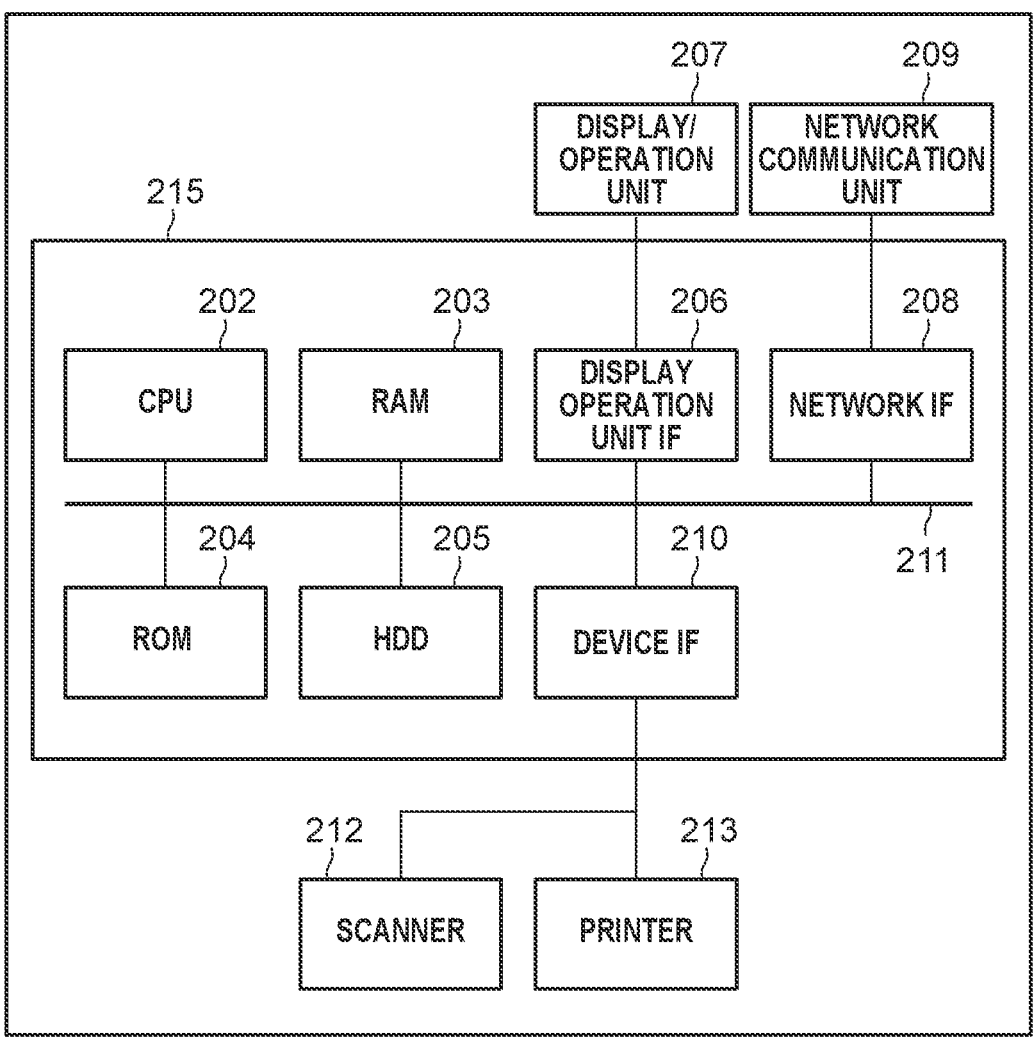
FIG. 2 is a block diagram illustrating an example of a hardware configuration of a printer.

FIG. 2 is a block diagram illustrating an example of a hardware configuration of a printer, which is one example of an image processing apparatus.

The printer includes a controller unit 215. The controller unit 215 controls a network communication unit 209, a display/operation unit 207, a scanner 212, and a printer 213. The controller unit 215 includes a CPU 202, a RAM 203, a ROM 204, a hard disk drive 205, a display operation unit interface (IF) 206, a network IF 208, and a device IF 210, and these components are connected by a system bus 211. In FIG. 2, assumed is a configuration of a copy machine, a multi-function peripheral, or the like, which includes both the scanner 212 and the printer 213, but the present disclosure can be applied to a single-function apparatus (printer and scanner) including either the scanner 212 or the printer 213.

The CPU 202 controls the whole of a system of the printer 213. The RAM 203 is a system work memory used by the CPU 202 to operate and is also an image memory to temporarily store image data and setting data. An operating system, programs of system software, application software, and the like, and data are stored in the RAM 203. A program for implementing processing regarding a flowchart in the present exemplary embodiment is executed by the CPU 202. The flowchart will be described below. The network IF 208 is connected to the network communication unit 209 and can communicate with a mobile terminal 304 and a cloud service 305.

The display/operation unit 207 includes an operation panel configured to accept a user operation to select a print function or the like of the printer and make some kind of settings. The operation panel is implemented by a display device, such as a touch panel, or by the touch panel and hardware keys.

With the operation panel, it is possible to operate at least one of a plurality of functions (the print function, a scan function, and the like) of the image processing apparatus and a plurality of settings.

Figure 3:
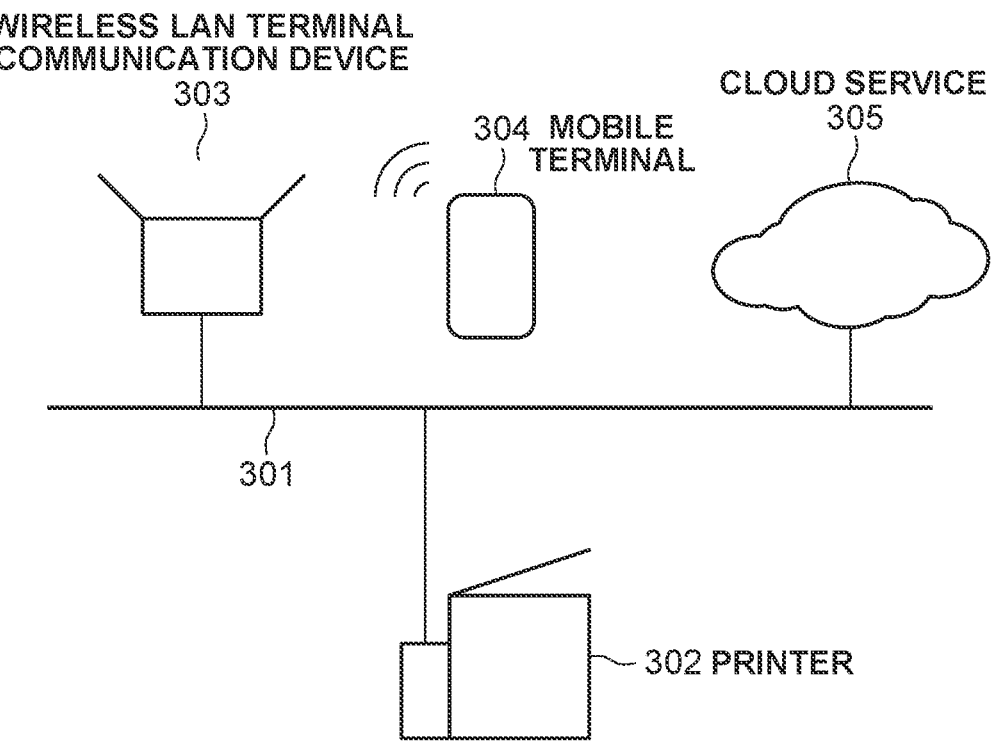
FIG. 3 is a diagram illustrating a configuration example of a network system including the mobile terminal and the printer.

FIG. 3 is a diagram illustrating a configuration example of a network system including the mobile terminal and the printer.

A printer 302, a wireless local area network (LAN) terminal communication device 303, and the cloud service 305 can perform communication via a network 301. The mobile terminal 304 can be connected to the network 301 via the wireless LAN terminal communication device 303. The mobile terminal 304 and the printer 302 may be directly connected to each other by predetermined wireless communication and communicate with each other without the wireless LAN terminal communication device 303.

Figure 4:
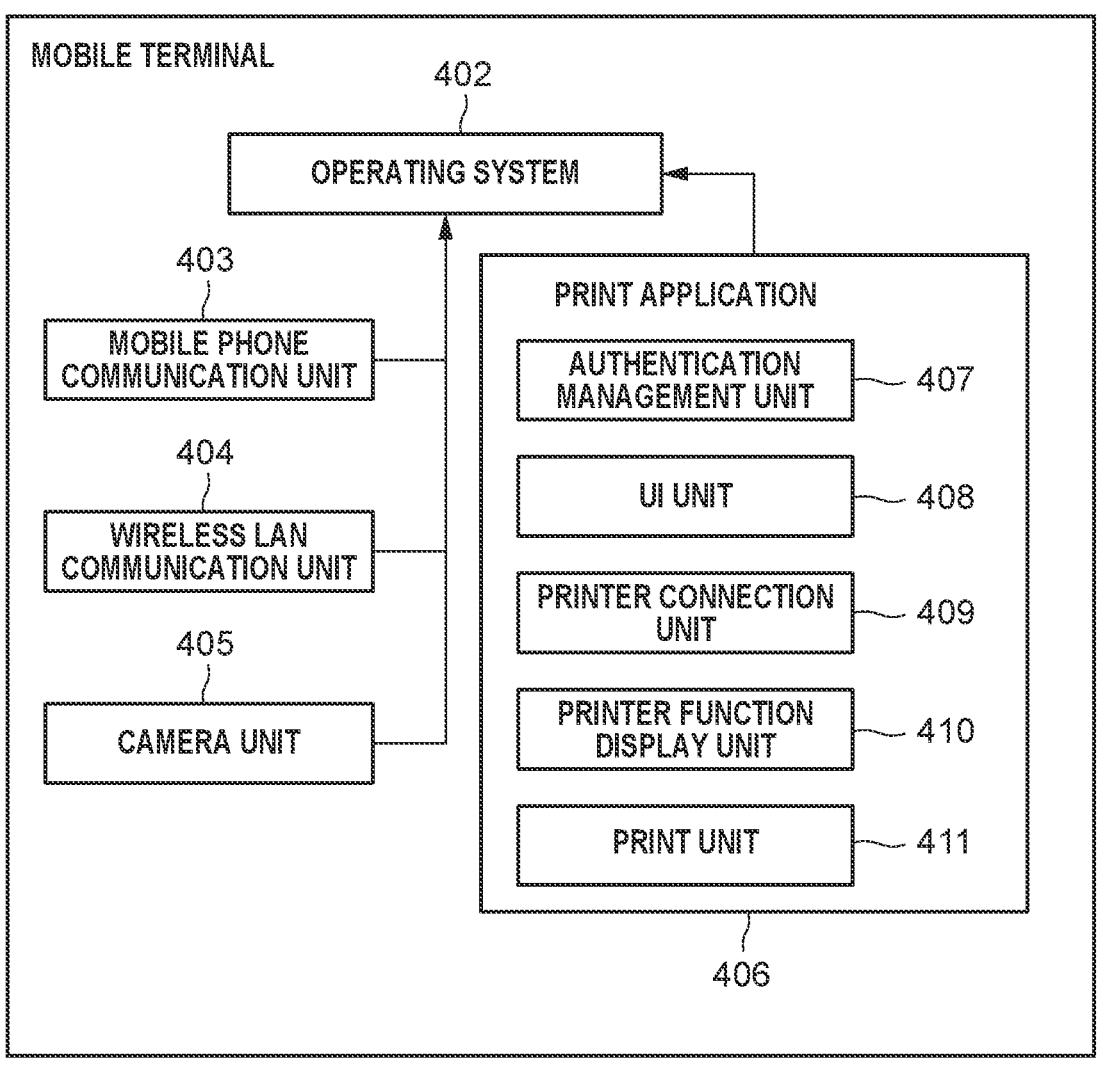
FIG. 4 is an example of a diagram illustrating a software configuration of the mobile terminal.

FIG. 4 is an example of a diagram illustrating a software configuration of the mobile terminal.

In the mobile terminal, an operating system 402 is executed. A print application 406 is installed in the mobile terminal. The print application 406 is a program for implementing an authentication management unit 407, a user interface (UI) unit 408, a printer connection unit 409, a printer function display unit 410, and a print unit 411. The print application 406 is one example of an application to display a display content of a printer operation panel on the display 114 based on information provided by the printer, accept a user operation performed on the display 114, and remotely operate the printer. The UI unit 408 performs control to display the display content of the printer operation panel on the display 114. The printer connection unit 409 controls connection to a printer selected as a printer to which a print instruction is to be given. The print unit 411 controls transmission of a print job to the connected printer. The printer function display unit 410 controls screen display to make settings of the print job based on a printer function.

A mobile phone communication unit 403 uses the mobile phone data communication unit 112 to control bidirectional communication in a mobile network. A wireless LAN communication unit 404 uses the wireless communication unit 111 to control communication with the wireless LAN terminal communication device 303 and the like. Through the above-described communication, an application in the mobile terminal can communicate with the cloud service 305 and the printer 302. A camera unit 405 can use the camera 113 via the camera control unit 107.

Figure 7:
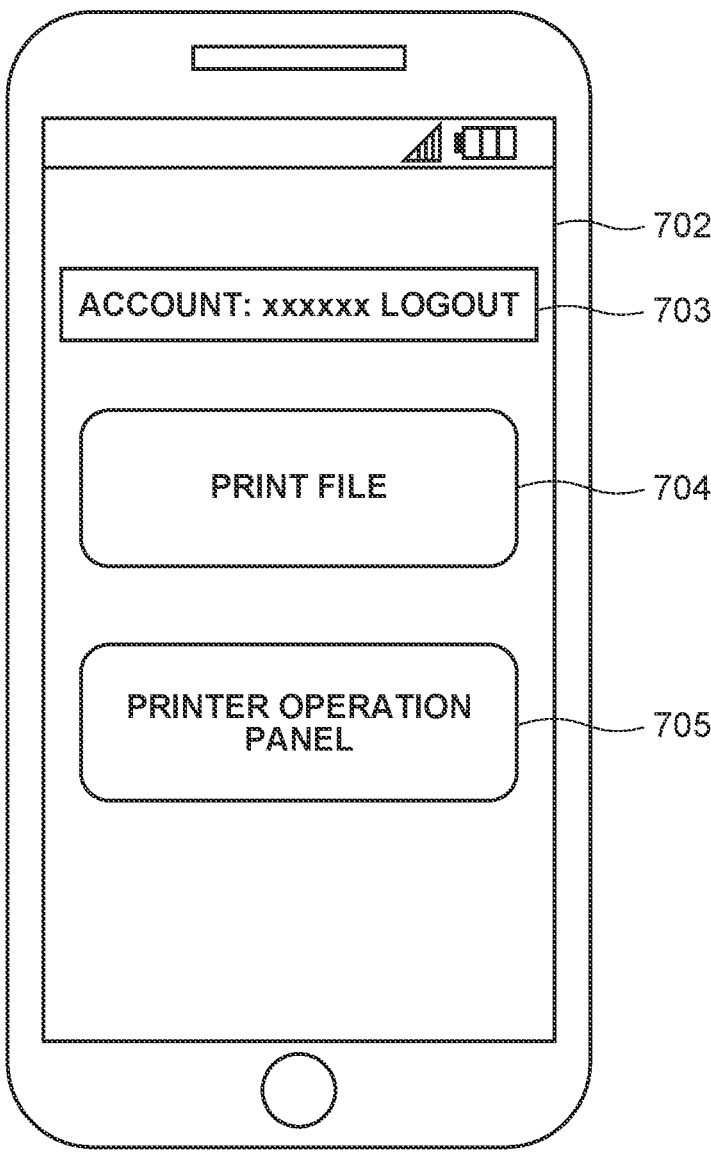
FIG. 7 illustrates an example of a main screen in the print application.

FIG. 7 illustrates an example of a main screen 702 provided by the print application 406 after the user has logged in. In login information 703, displayed is information about an account with which the login to the print application 406 is made. The print application 406 can accept a logout operation from the user in the login information 703. A PRINT FILE button 704 is a button for making a transition to a print screen illustrated in FIG. 8. A PRINTER OPERATION PANEL button 705 is a button for making a transition to a printer connection screen for making settings to acquire information about the operation panel from the printer. The printer connection screen is illustrated in FIG. 9.

Figure 8:
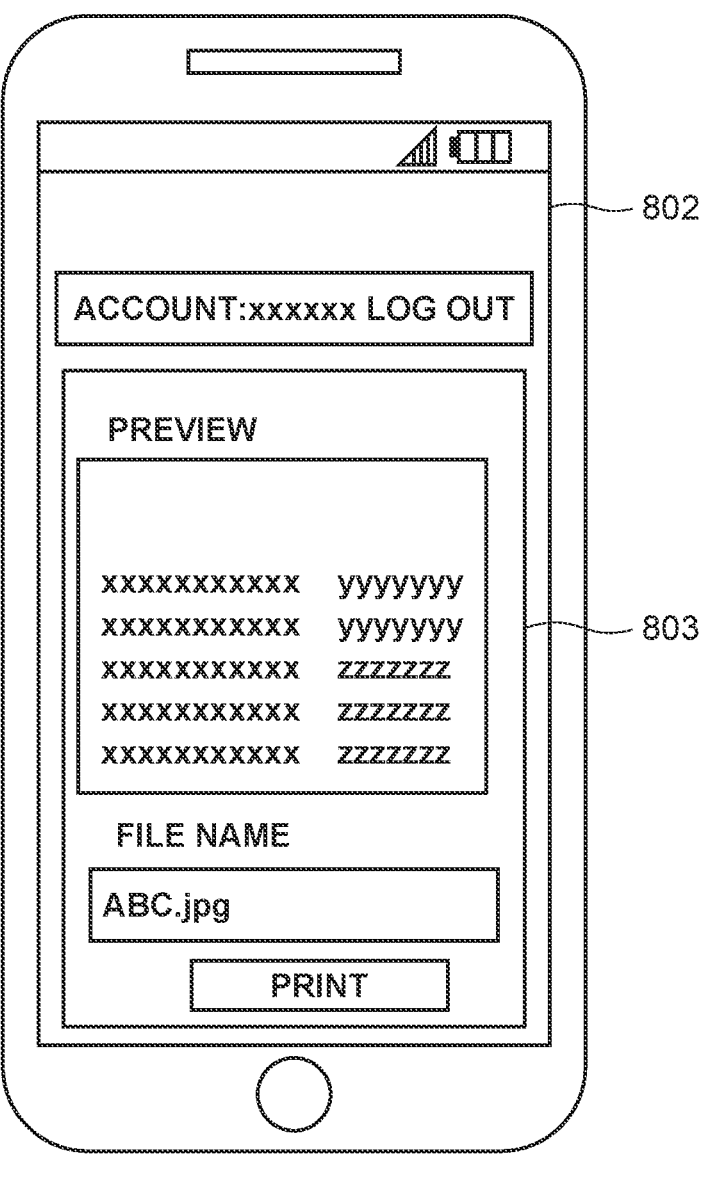
FIG. 8 illustrates an example of a print screen in the print application.

A print screen 802 illustrated in FIG. 8 includes print information 803, in which a file desired to be printed, a print preview of the file, a print instruction button, and the like are displayed.

Figure 9:
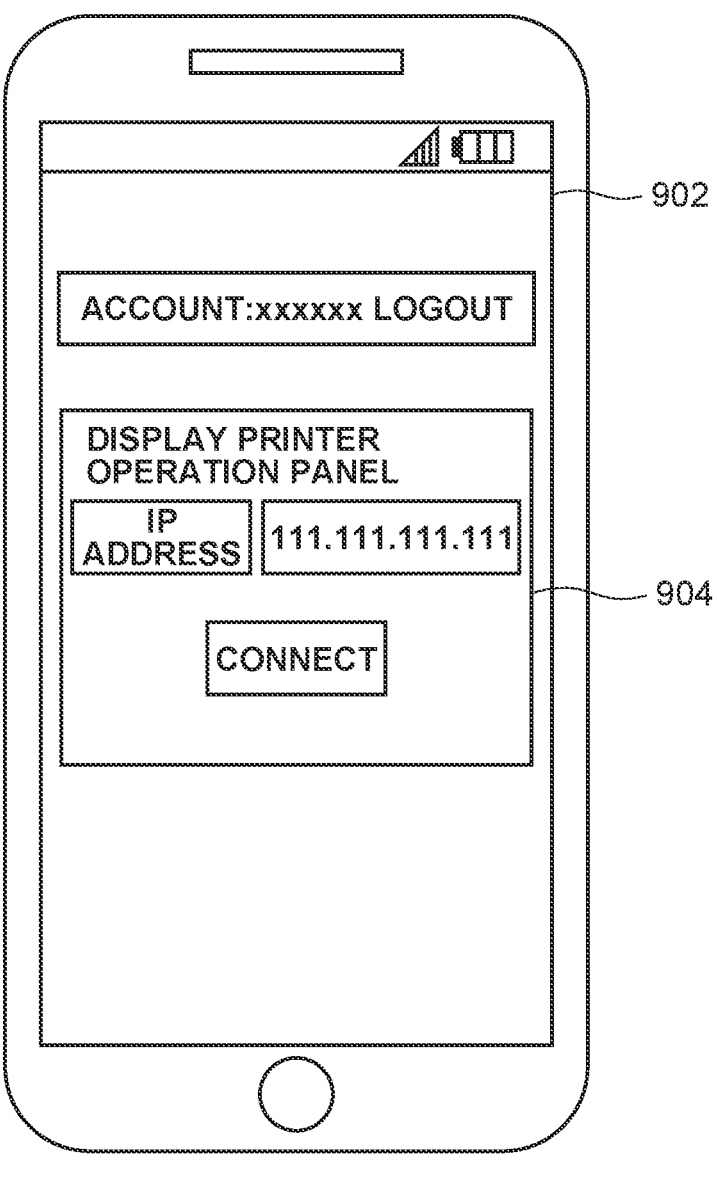
FIG. 9 illustrates an example of a printer connection screen in the print application.

A printer connection screen 902 illustrated in FIG. 9 includes printer information 904. The user can enter, in the printer information 904, address information, such as an Internet Protocol (IP) address, of a printer to which the user wants to connect the mobile terminal. The user presses a connection button in the printer information 904, whereby the UI unit 408 is connected to the printer using the IP address via the wireless LAN communication unit 404. As a method of designating the IP address in the printer information 904, the print application 406 may search for connectable printers by network broadcast search and cause the user to select a printer from the detected printers.

The UI unit 408 executes processing of making a request to the connected printer for information corresponding to the display content of the printer operation panel for performing a remote operation of the printer. Details of the processing will be described with reference to FIG. 5.

The print application 406 is also capable of skipping the user's login and accepting a user operation of the PRINTER OPERATION PANEL button 705 and the printer information 904. In this case, the print application 406 makes a request to the user for a login operation before and after the mobile terminal is connected to the printer.

Figure 17:
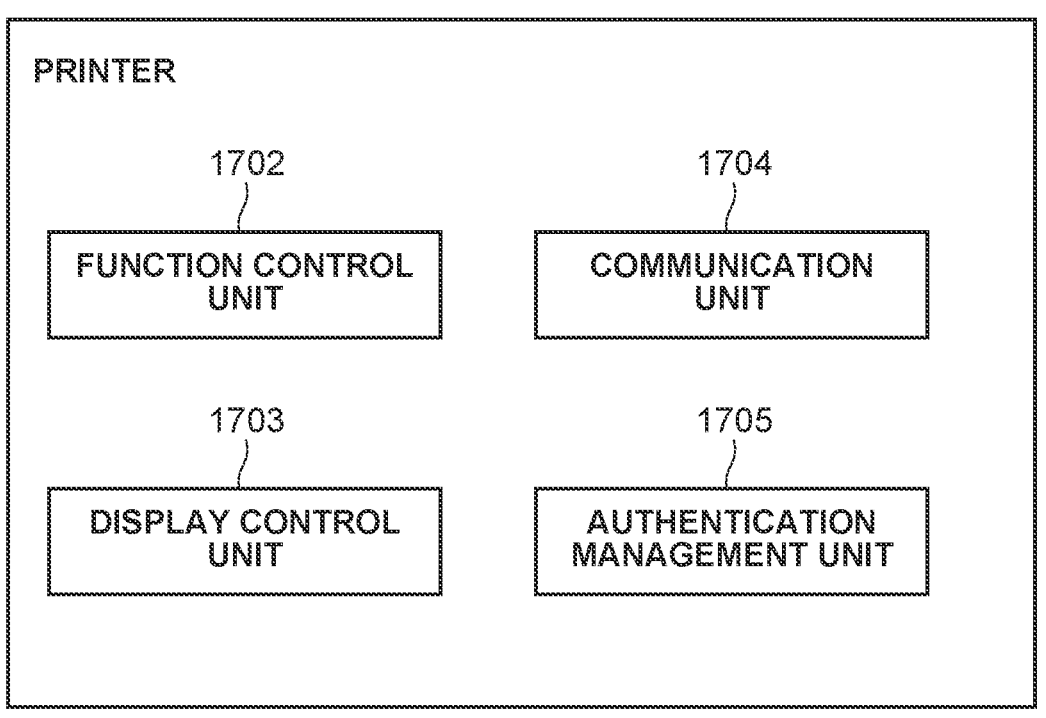
FIG. 17 is an example of a diagram illustrating a software configuration of the printer.

FIG. 17 is an example of a diagram illustrating a software configuration of the printer.

A function control unit 1702 controls execution of a function of the scanner 212, the printer 213, or the like of the printer according to an operation input via a display panel provided by a display control unit 1703 or a command, such as a print job input via a communication unit 1704. The display control unit 1703 provides the display/operation unit 207 with the display panel. The communication unit 1704 plays a role of performing communication control for accepting data from a network or the like and providing information corresponding to a display content of the operation panel to the external apparatus. An authentication management unit 1705 manages the user who has been authenticated and logged in to the printer. Specifically, the authentication management unit 1705 manages an account of a user who has logged in as an administrator and an account of a user who has logged in as a general user.

FIG. 5 is a flowchart for describing processing executed by each of the mobile terminal and the printer according to the present exemplary embodiment. Start-up of the print application 406 in the mobile terminal starts the present processing.

Figure 6:
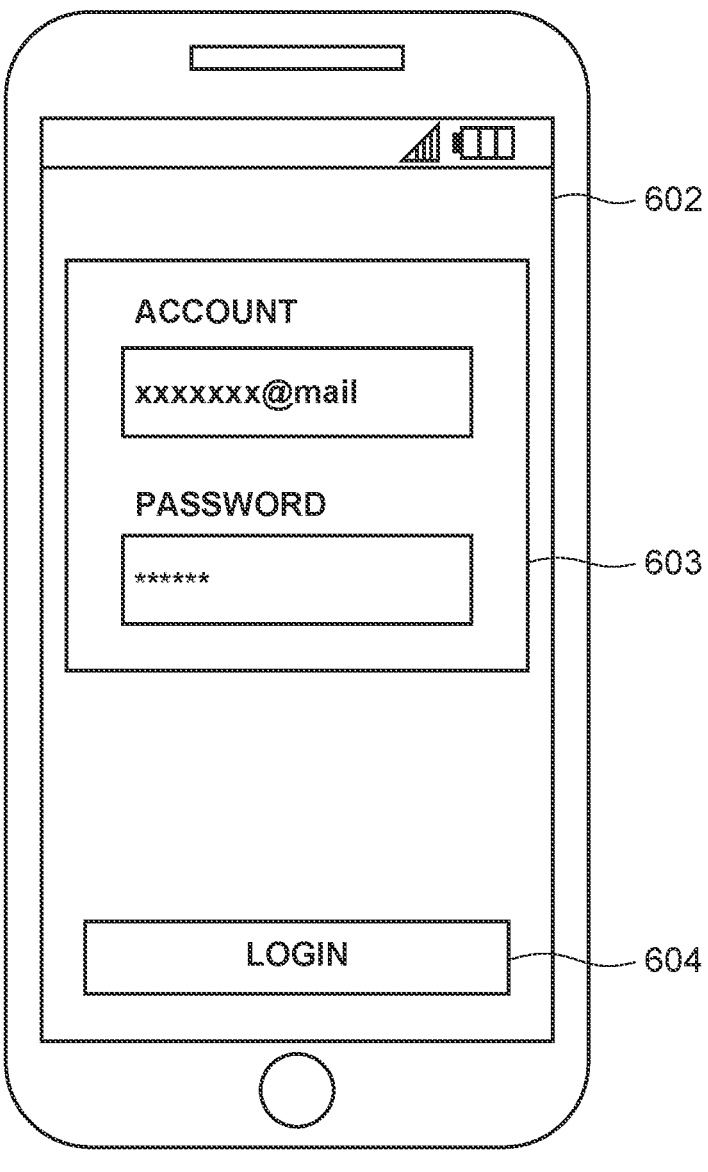
FIG. 6 illustrates an example of a login screen in a print application.

In step S502, the authentication management unit 407 accepts a login operation performed by the user using a screen 603 and a LOGIN button 604 as illustrated in FIG. 6 and executes login processing. The started print application 406 displays the screen 603 on an application screen 602 in a case where a login is required. In a case where the login operation is accepted, for example, it is possible to make the user log in after the authentication management unit 407 performs communication with the cloud service 305 to make user authentication in the cloud service 305. The authentication management unit 407 manages an account of the log-in user.

In step S503, in a case where the user operation on a CONNECT button displayed in FIG. 9 is accepted, the UI unit 408 is connected to the printer with an IP address designated in the printer information 904 and transmits a request regarding permission of display of the printer operation panel to the printer. The request regarding the permission of the display of the printer operation panel includes information about the account of the user who has logged in to the print application 406. The login processing in step S502 may be executed immediately before transmission of the request regarding the permission of the display on the printer operation panel.

In step S504, the communication unit 1704 of the printer receives the request regarding the permission of the display on the printer operation panel from the mobile terminal.

In step S505, the authentication management unit 1705 determines whether the user has logged in to the printer. In a case where the administrator or the general user has logged in, it can be regarded that the operation panel is being currently in use. In a case where the user has logged in to the printer (YES in step S505), the processing proceeds to step S506. In a case where the user has not logged in to the printer (NO in step S505), the processing proceeds to step S508.

In step S506, the authentication management unit 1705 determines whether the accounts of respective users are matched with each other based on account information included in the request received in step S504 and account information about the user who has logged in to the printer. The account information about the user who has logged in to the print application 406 may be acquired by the authentication management unit 1705 making an inquiry to the cloud service 305. In a case where it is determined that the two accounts are not matched with each other (NO in step S506), the processing proceeds to step S507. In a case where it is determined that the two accounts are matched with each other (YES in step S506), the processing proceeds to step S508.

Figure 10:
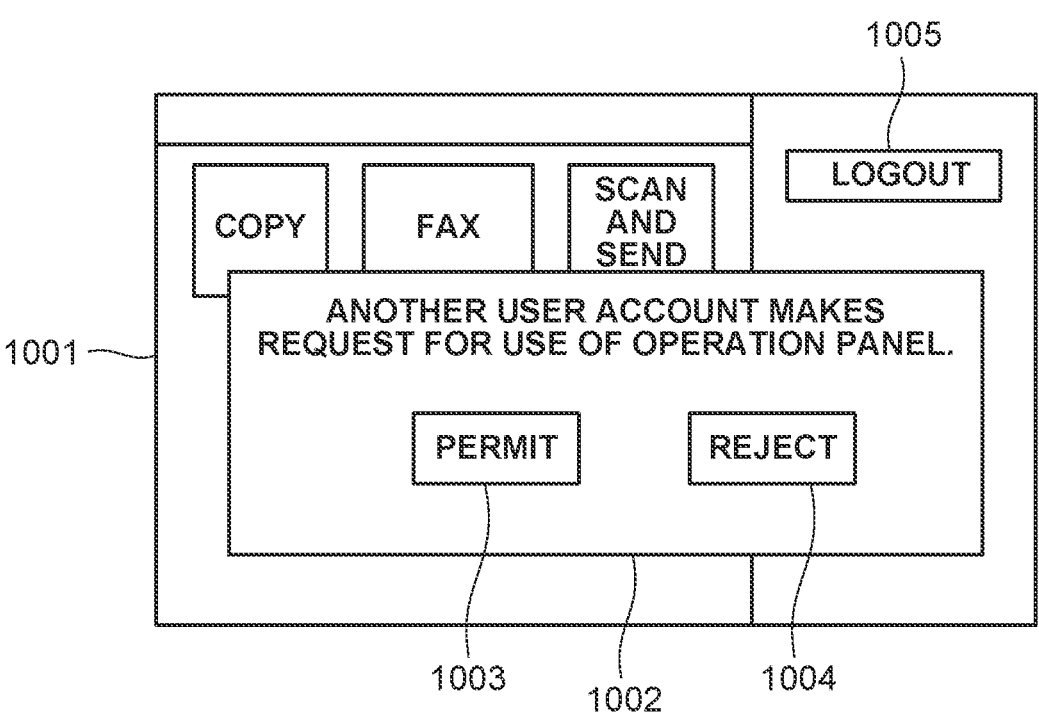
FIG. 10 illustrates a display example of a confirmation screen on a printer operation panel.

In step S507, the display control unit 1703 displays a confirmation screen 1002 illustrated in FIG. 10 on the display/operation unit 207.

FIG. 10 illustrates an example in which the confirmation screen 1002 is displayed so as to be superimposed on a printer operation panel 1001 that is being displayed on the display/operation unit 207. A message indicating "ANOTHER USER ACCOUNT MAKES REQUEST FOR USE OF OPERATION PANEL" is displayed on the confirmation screen 1002, and a PERMIT button 1003 for accepting the user operation and a REJECT button 1004 are arranged on the confirmation screen 1002. A LOGOUT button 1005 is a button with which the user can perform a logout operation. The printer operation panel 1001 is an example of a screen prepared in the printer and can display the confirmation screen 1002 even when the user is operating another screen.

In step S508, the authentication management unit 1705 holds a status regarding use of the printer operation panel.

FIG. 11 is a diagram for describing six statuses regarding the use of the printer operation panel managed by the authentication management unit 1705.

The statuses are classified into status patterns 1 to 6 according to a combination of available/unavailable of the printer operation panel and match/non-match between the login account of the print application and the login account of the printer, as illustrated in 1102. In step S508, any one of these statuses is managed by the authentication management unit 1705.

In the present exemplary embodiment, in a case where the login account of the print application and the login account of the printer are matched with each other, a remote operation of the operation panel from the print application is basically permitted. Thus, in a case where it is determined that the two accounts are matched with each other (YES in step S506), the authentication management unit 1705 holds information indicating the status pattern 1 in step S508.

In a case where it is determined that the two accounts are not matched with each other (NO in step S506) and the PERMIT button 1003 in FIG. 10 is selected, the authentication management unit 1705 holds information indicating the status pattern 2 in step S508. In a case where it is determined that the two accounts are not matched with each other (NO in step S506) and the REJECT button 1004 in FIG. 10 is selected, the authentication management unit 1705 holds information indicating the status pattern 5 in step S508.

In a case where it is determined the user has not logged in to the printer (NO in step S505), the authentication management unit 1705 holds information indicating the status pattern 3 in step S508.

As an exception, in a case where an administrator setting to always prohibit the use of the printer operation panel from the mobile terminal is enabled in the printer, the authentication management unit 1705 holds any one of the status patterns 4 to 6 in step S508.

In step S509, the communication unit 1704 transmits a response to the request regarding the permission of the display of the printer operation panel to the mobile terminal. The response includes information corresponding to the status pattern held by the authentication management unit 1705 in step S508.

Figure 12:
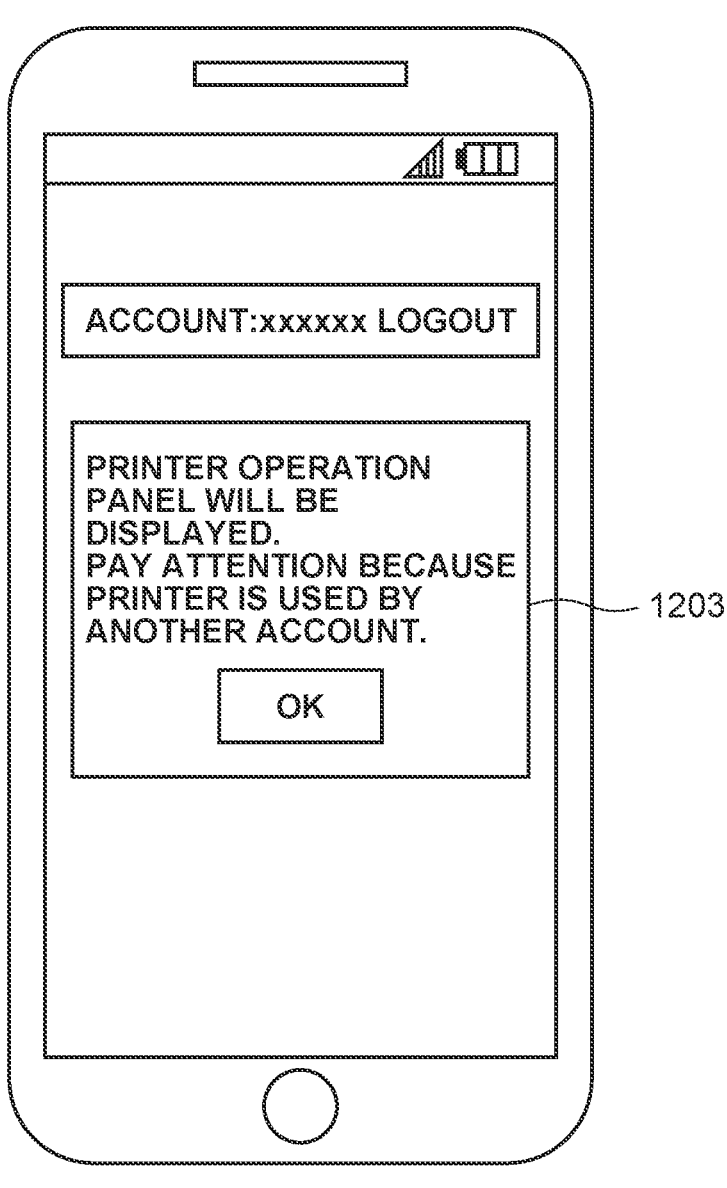
FIG. 12 illustrates an example of a message displayed before a printer operation panel in the print application is provided.

In step S510, the UI unit 408 of the mobile terminal displays a message based on a status regarding the use of the operation panel on the printer, based on the information corresponding to the status pattern included in the response from the printer. FIG. 12 illustrates an example of a message 1203 displayed in a case where the response indicating the status of the above-mentioned status pattern 2 is made. In step S510, in a case where the responded status corresponds to the status pattern 1 or 3, a message such as "PRINTER OPERATION PANEL WILL BE DISPLAYED" is displayed. In a case where the responded status corresponds to the status pattern 4, 5, or 6, a message such as "PRINTER OPERATION PANEL IS UNAVAILABLE" is displayed. In a case where an OK button on a screen in FIG. 12 is pressed, the processing proceeds to step S511.

In step S511, the UI unit 408 determines whether the printer operation panel is available. In a case where the printer operation panel is available (YES in step S511), the processing proceeds to step S512. In a case where the printer operation panel is unavailable (NO in step S511), the processing ends. In a case where the processing ends, it is assumed that the screen returns to the main screen as illustrated in FIG. 7.

Figure 13:
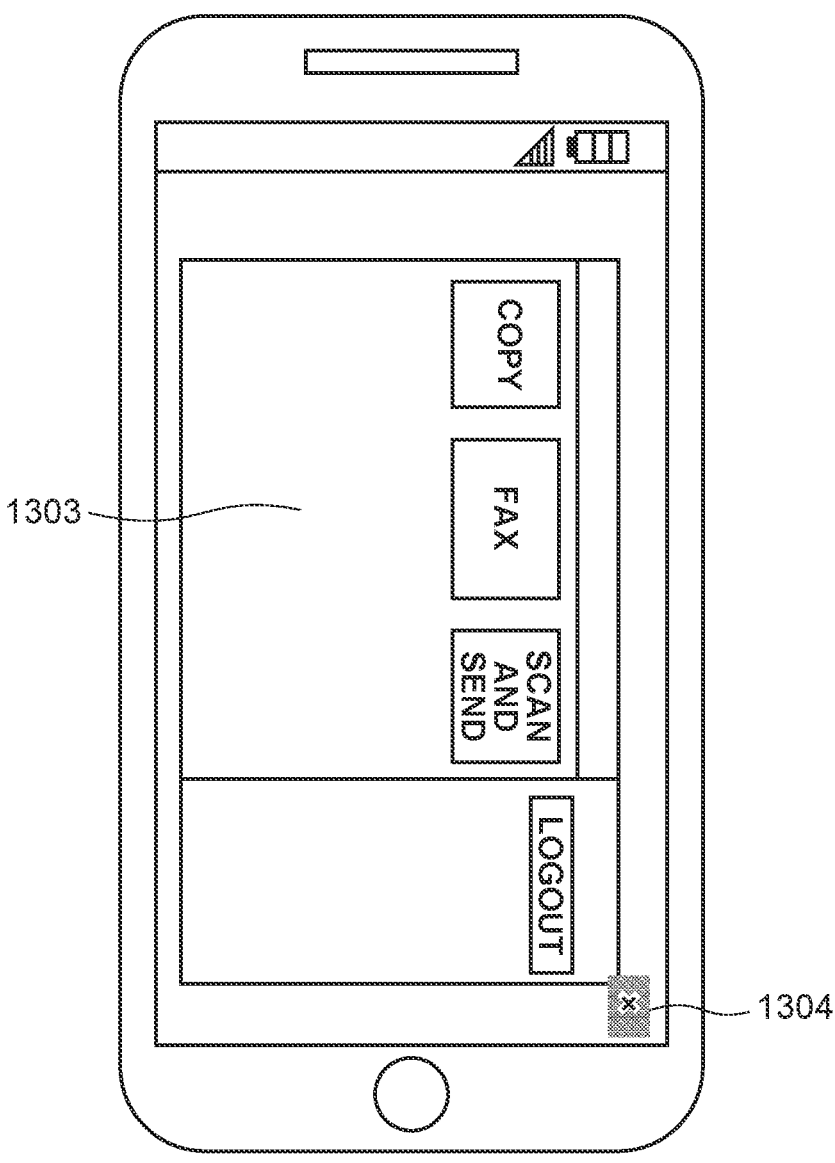
FIG. 13 illustrates an example of a screen displayed on the printer operation panel in the print application.

In step S512, the UI unit 408 makes a request to the printer for the information corresponding to the display content of the operation panel currently displayed in the printer. The UI unit 408 displays a printer operation panel 1303 for a remote operation of the printer as illustrated in FIG. 13 on the display 114 based on the information provided by the printer in response to the request. In step S513, the UI unit 408 accepts a user operation via the printer operation panel displayed on the display 114. In a case where a content of the operation indicates an operation of the printer, the UI unit 408 controls the printer connection unit 409 to transmit data indicating the content of the operation to the printer. In a case where the content of the accepted operation indicates an operation of ending the remote operation of the printer by pressing of a close button 1304, the processing ends.

In a case where the communication unit 1704 of the printer receives the request regarding the permission of the display of the printer operation panel, which is described in step S504, while the login as the administrator has been made to the printer, the processing may skip steps S506 to S508 and proceed to step S509, in which the communication unit 1704 transmits a response indicating that the operation panel is unavailable to the mobile terminal.

A second exemplary embodiment is now to be described. In the first exemplary embodiment, the use of the printer operation panel is executed from the mobile terminal during a login state after the login has been made to the printer. The second exemplary embodiment assumes processing performed in a case where the operation panel is operated by the user of the printer while the printer operation panel as illustrated in FIG. 13 is being used on the mobile terminal. Because configurations of the printer, the mobile terminal, the system, and the like are similar to those in the first exemplary embodiment, a detailed description thereof is omitted and a difference in processing will be described in detail.

Figure 14:
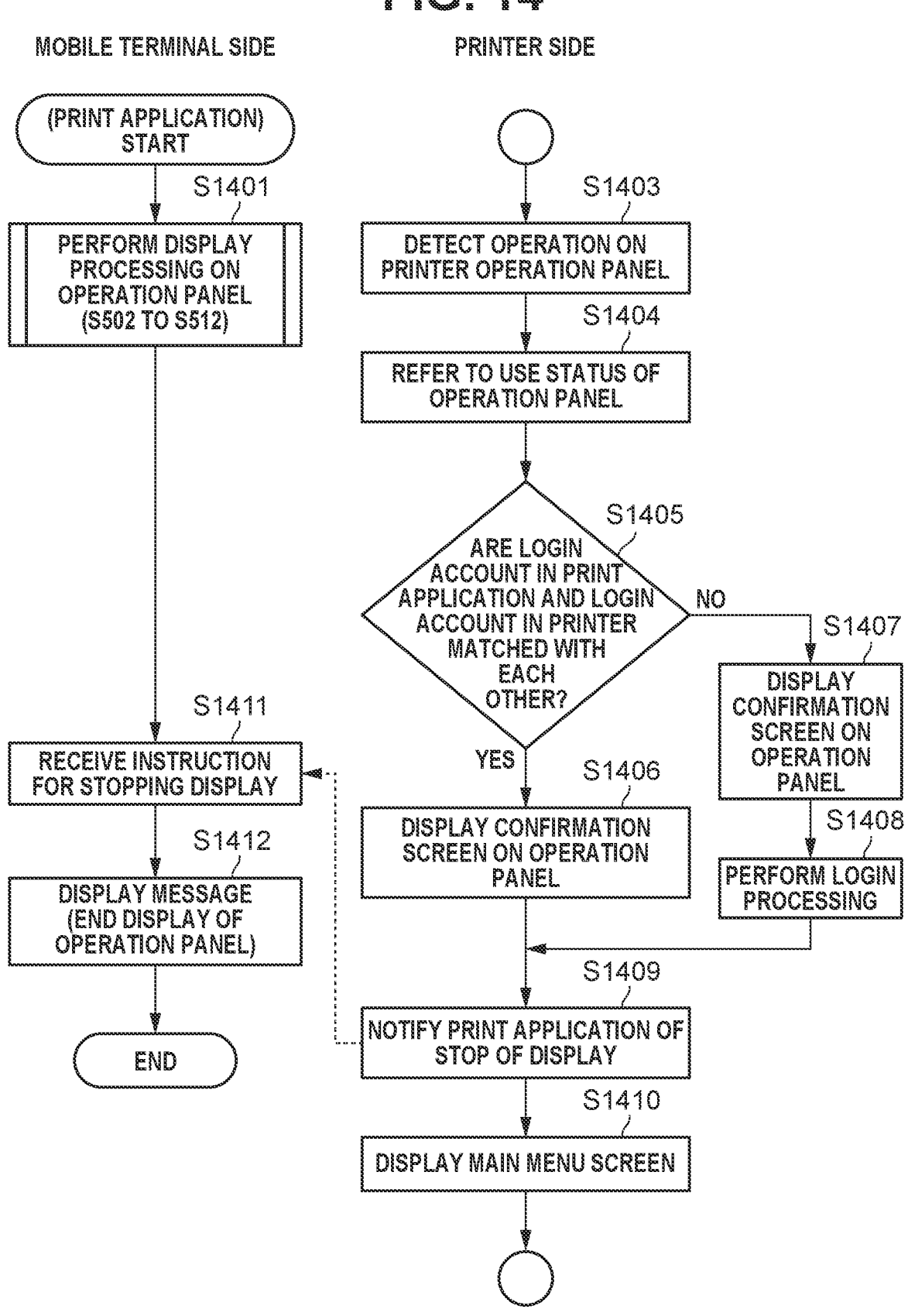
FIG. 14 is a flowchart for describing processing executed when a user operation is performed on the printer while the printer operation panel is displayed in the mobile terminal.

FIG. 14 is a flowchart for describing processing executed when a user operation is performed on the printer while the printer operation panel is being displayed with the print application 406 on the mobile terminal.

In step S1401, in the mobile terminal, the print application 406 displays the printer operation panel according to the processing in steps S502 to S512 described with reference to FIG. 5.

In step S1403, in the printer, the display control unit 1703 detects a user operation on the printer operation panel 1001 via the display/operation unit 207.

In step S1404, the authentication management unit 1705 refers to the status information regarding the use of the printer operation panel held in step S508. In a case where the user operation detected in step S1403 is a login operation, a login account used in the printer having the status information to be referred to is updated with a user account according to the login operation.

In step S1405, the authentication management unit 1705 determines whether the respective user accounts are matched with each other based on account information about the user who has logged in to the print application 406 and account information used to log in to the printer. In a case where it is determined that the two accounts are not matched with each other (NO in step S1405), the processing proceeds to step S1407. In a case where it is determined that the two accounts are matched with each other (YES in step S1405), the processing proceeds to step S1406.

Figure 15:
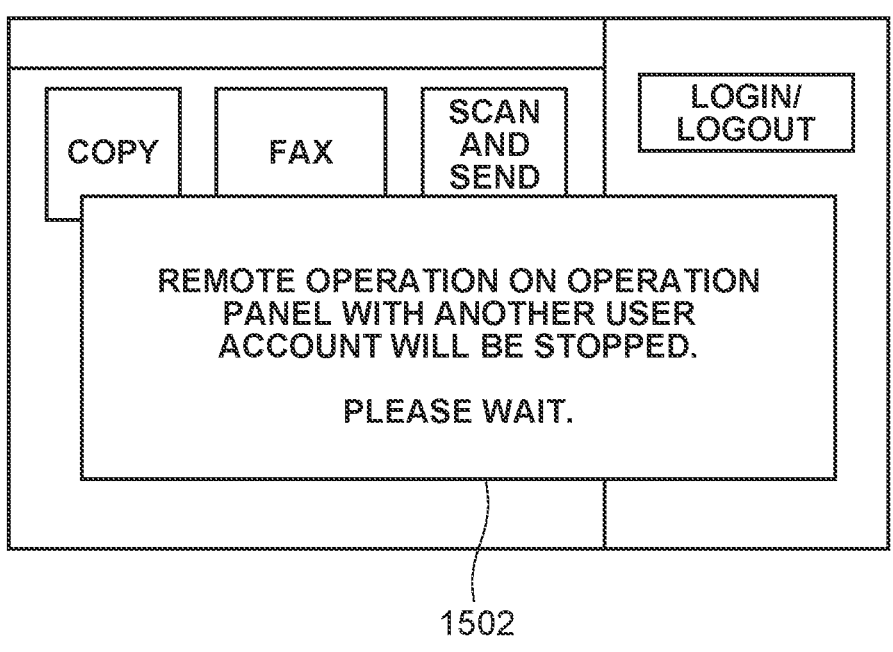
FIG. 15 illustrates an example of a confirmation message regarding stop of provision of the printer operation panel in the printer.

In step S1406, the display control unit 1703 displays a confirmation message 1502 as illustrated in FIG. 15 on the display/operation unit 207. The message such as "REMOTE OPERATION ON OPERATION PANEL WITH ANOTHER USER ACCOUNT WILL BE STOPPED. PLEASE WAIT." is displayed.

In step S1407, the display control unit 1703 displays a confirmation message similar to that displayed in step S1406.

Figure 16:
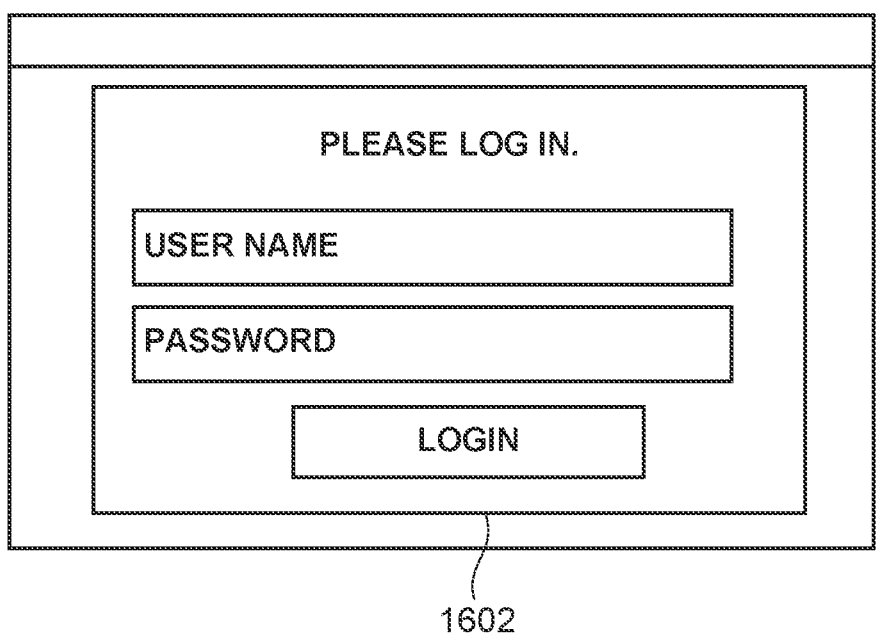
FIG. 16 illustrates an example of a login screen in the printer.

In step S1408, the display control unit 1703 displays a screen 1602 requesting the user to log in to the printer, as illustrated in FIG. 16. If the user has already logged in by the user operation in step S1403, the processing in step S1408 is omitted.

In step S1409, the communication unit 1704 notifies the print application on the mobile terminal of an instruction for stopping the display of the printer operation panel.

In step S1410, the display control unit 1703 displays the main menu screen on the display/operation unit 207. Subsequently, the printer is to be used in response to a user operation, but a description thereof is omitted here.

In step S1411, in the mobile terminal, the UI unit 408 of the print application 406 receives the instruction for stopping the display of the printer operation panel from the printer via the wireless LAN communication unit 404. In step S1412, the UI unit 408 displays a message indicating "SINCE OPERATION ON PRINTER IS PERFORMED, DISPLAY OF PRINTER OPERATION PANEL WILL BE STOPPED" on the display 114. The UI unit 408 stops the display of the printer operation panel in the print application 406.

Some embodiments of the present disclosure relate to an apparatus or a system that plays a main role of executing one or more software applications (programs) that implement the functions in the above-mentioned exemplary embodiments.

Aspects of the present disclosure also include a method that is executed in the apparatus or the system and that is used for implementing the above-mentioned exemplary embodiments. The program is supplied to the system or the apparatus via a network or a storage medium of various kinds, loaded in one or more memories by one or more computers (a CPU, a microprocessing unit (MPU), or the like) of the system or the apparatus, and then executed. That is, the aspects of the present disclosure further include the program itself, or various kinds of computer readable storage media that store the program. The present disclosure can be implemented by a circuit (for example, an application-specific integrated circuit (ASIC)) that implements the functions of the above-mentioned exemplary embodiments.

According to the present disclosure, it is possible to provide a mechanism of providing information corresponding to a display content of an operation panel from an image processing apparatus to an external apparatus in consideration of both account information about a user of the image processing apparatus and account information about a user of the external apparatus.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-021395, which was filed on Feb. 15, 2023 and which is hereby incorporated by reference herein in its entirety.

What is claimed is:

1. An image processing apparatus comprising:
a display device, wherein the display device is configured to provide an operation panel configured to receive an operation regarding at least one of a print function or a scan function;
one or more memories storing instructions; and
one or more processors configured to execute the instructions causing the image processing apparatus to:
receive a request for permission of display of the operation panel from an external apparatus,
display, on the display device, a confirmation screen in a case where an account of a user who has logged in to an application of the external apparatus, the account being included in the request, and an account of a user who has logged in to the image processing apparatus are not matched with each other, and
in a case where the permission of the display of the operation panel on the external apparatus is accepted via the confirmation screen, transmit, to the external apparatus, information corresponding to a display content of the operation panel to provide the display content in the application.

2. The image processing apparatus according to claim 1, wherein the instructions further cause the image processing apparatus to, in a case where the account of the user who has logged in to the application of the external apparatus, the account being included in the request, and the account of the user who has logged in to the image processing apparatus are matched with each other, transmit the information corresponding to the display content of the operation panel to the external apparatus without display of the confirmation screen.

3. The image processing apparatus according to claim 1, wherein, in response to the request from the external apparatus, the information corresponding to the display content of the operation panel is transmitted to the external apparatus.

4. The image processing apparatus according to claim 1, wherein, based on input of address information about the image processing apparatus to the application, the request for the permission of the display of the operation panel is transmitted from the external apparatus to the image processing apparatus.

5. The image processing apparatus according to claim 1, wherein the instructions further cause the image processing apparatus to, in a case where a user operation to use the operation panel is detected in the image processing apparatus when the display content of the operation panel is provided in the application based on the information corresponding to the display content of the operation panel, transmit a notification about a stop instruction of the display of the operation panel to the external apparatus.

6. A method executed in an image processing apparatus comprising a display device configured to provide an operation panel configured to accept an operation regarding at least one of a print function or a scan function, the method comprising:
receiving a request for permission of display of the operation panel from an external apparatus;
displaying a confirmation screen in a case where an account of a user who has logged in to an application of the external apparatus, the account being included in the request, and an account of a user who has logged in to the image processing apparatus are not matched with each other; and
in a case where the permission of the display of the operation panel on the external apparatus is accepted via the confirmation screen, transmitting, to the external apparatus, information corresponding to a display content of the operation panel to provide the display content in the application.

7. A non-transitory computer readable storage medium that stores computer-executable instructions to cause a computer to execute a method in an image processing apparatus comprising a display device configured to provide an operation panel configured to accept an operation regarding at least one of a print function or a scan function, the method comprising:
receiving a request for permission of display of the operation panel from an external apparatus;
displaying a confirmation screen in a case where an account of a user who has logged in to an application of the external apparatus, the account being included in the request, and an account of a user who has logged in to the image processing apparatus are not matched with each other; and
in a case where the permission of the display of the operation panel on the external apparatus is accepted via the confirmation screen, transmitting, to the external apparatus, information corresponding to a display content of the operation panel to provide the display content in the application.

* * * * *